(12) United States Patent
Gorski

(10) Patent No.: US 7,416,755 B2
(45) Date of Patent: Aug. 26, 2008

(54) RICE-BASED SNACK CHIP AND METHOD OF MAKING SAME

(75) Inventor: Richard Gorski, Foster City, CA (US)

(73) Assignee: Grell Farms LLC

( * ) Notice: Subject to any disclaimer, the term of this patent is extended or adjusted under 35 U.S.C. 154(b) by 431 days.

(21) Appl. No.: 11/137,757

(22) Filed: May 24, 2005

(65) Prior Publication Data

US 2005/0220963 A1 Oct. 6, 2005

Related U.S. Application Data

(62) Division of application No. 10/113,972, filed on Mar. 29, 2002, now Pat. No. 7,189,424.

(51) Int. Cl.
*A23L 1/164* (2006.01)

(52) U.S. Cl. ............... 426/560; 426/438; 426/615; 426/618; 426/808

(58) Field of Classification Search ............... None
See application file for complete search history.

(56) References Cited

U.S. PATENT DOCUMENTS

| | | | | |
|---|---|---|---|---|
| 3,922,370 A | * | 11/1975 | Prakash | 426/559 |
| 4,623,546 A | * | 11/1986 | Holay et al. | 426/448 |
| 4,861,609 A | * | 8/1989 | Willard et al. | 426/550 |
| 6,210,720 B1 | * | 4/2001 | Leusner et al. | 426/74 |

* cited by examiner

*Primary Examiner*—Lien Tran
(74) *Attorney, Agent, or Firm*—H. Michael Brucker

(57) ABSTRACT

A rice-based snack chip made from a dough including the dry ingredients of bumped rice kernels, long-grain pregelatinized rice flour, medium-grain course white rice flour and in which the bumped rice kernels are partially hydrated, bumped, partially dehydrated and fried as the chip is made.

13 Claims, No Drawings

RICE-BASED SNACK CHIP AND METHOD OF MAKING SAME

This application is a divisional of U.S. Ser. No. 10/113,972 filed on Mar. 29, 2002, now U.S. Pat. No. 7,189,424.

The present invention relates to snack food chips and, in particular, to a dry mix, a dough, and a processed brown rice product for use in making rice-based snack chips and to methods for making same.

BACKGROUND OF THE INVENTION

The world of snack chips includes a wide variety of base materials, including, for example, potatoes, corn, taro, sweet potatoes and cheese, to name a few. Prior to the present invention, however, the use of rice as the primary base material for a snack chip has eluded the snack food industry.

In order for a snack chip to be commercially successful, it must taste good, look good, feel good when eaten and be capable of large scale production. The look good and feel good features usually translate into the chip having a structure that keeps the chip from crumbling during processing, packaging, transport or use (prior to reaching a mouth). Further, the structure of the chip wants to give it a fresh "crunchability" when eaten. The look good feature translates into the chip having a toasted appearance that is usually associated with crunchiness.

Some of the difficulties in using rice as a base material for a snack chip are that it does not naturally acquire a toasted appearance, it tends to crumble easily and is sticky when cooked and made into a dough, making it unusable with existing machinery commonly used to make chips from other base materials.

By the use of different forms of rice, the present invention overcomes these problems and produces a tasty snack chip that has desirable characteristics and necessary structural integrity.

BRIEF DESCRIPTION OF THE INVENTION

The present invention combines in water at least two different rice materials, together with other ingredients, to make a dough that can be sheeted, cut, parbaked and fried using presently existing equipment. The resulting chips are tasty, look appetizing, have the "crunch factor" that characterizes a good snack chip, and are structurally strong enough to remain whole until eaten.

It is the combination of different forms of rice that give the present invention the ability to make a dough that can be formed into a commercial snack chip using existing equipment commonly used to make a tasty snack chip from other base materials.

One of the forms of rice used in the present invention is bumped rice that has been cooked and then oven-toasted.

Bumped rice is typically a transient state of rice between a parcooked rice grain and crisp rice. Crisp rice is a well known and frequently used product in the manufacture of crisp candy bars, cookies, granola bars and other snacks and confections, in addition to its well known use as a breakfast food.

A typical crisp rice process is an oven-puffing process which begins with whole kernels of rice. The rice kernels are first cooked in a retort for several hours, together with sugar, salt and malt. The cooked kernels are then dried to a moisture content of 25% to 30%, tempered for about 15 hours to equilibrate moisture, and dried again to a moisture content of 18-20%. The dried kernels are then radiantly heated to plasticize the outside layers of the kernel, "bumped" on widely spaced flaking rolls, and tempered for 24 hours. At this point, the rice is in the form of hard, generally disk-shaped kernels not suitable as a constituent in a food product without further processing. For purposes of the present invention, rice at this stage of processing—bumped and tempered rice formed into hard, disk-shaped kernels—is referred to as "bumped rice kernels". In the prior art, the bumped rice kernels are puffed and toasted in a toasting oven for 30-45 seconds, resulting in a highly expanded cereal product with a tender, crisp structure. Rice in this form is commonly referred to as "rice crisp".

In the bumping step, the rice kernels are flattened, but not beyond the point wherein they lose their integrity as a grain per se; the bumped rice will thus assume a thickness dimension generally 50%-75% of the cooked tempered rice dimension just prior to bumping.

In the present invention, bumped rice kernels are used as one of the rice constituents in the dough from which chips of the invention are made. The bumped rice kernels, however, are further processed in a way that makes them suitable as a food constituent, but does not permit them to expand fully into rice crisp, as is done in the prior art.

Bumped rice kernels, as used in the present invention, is a commercially available product (for example, Item #CB04200 from California Cereal Products, Inc., in Oakland, Calif.) used exclusively to make crisp rice.

In the present invention, bumped rice is made a desirable snack chip ingredient by unique processing that transforms the bumped rice kernels from dense, hard-to-chew kernels to crunchy, but not airy, nuggets of nutty rice flavor. Bumped rice kernels processed according to the present invention are referred to herein as "rice nuggets".

In the present invention, bumped rice kernels, rice flour, as well as other ingredients, are mixed with water to form a dough. In forming the dough, the bumped rice kernels are partially hydrated along with the other ingredients. When the dough is formed into sheets by the rollers of a mechanical sheeter, the partially hydrated bumped rice kernels are bumped again. When the sheeted dough is baked to partially dehydrate the dough before frying, the partially hydrated and bumped rice kernels are also partially dehydrated. When the dough is cut into chip-size pieces and fried in oil along with the other constituents of the chip of the present invention, the processed bumped rice kernels do not puff up as they would had they not been further processed as described above. Instead, the bumped rice kernels enlarge only slightly, but enough to make them crisp and crunchy (but without being airy). In this state, the bumped rice kernels have been transformed into what are referred to herein as "rice nuggets". The rice nuggets provide the chip with a distinct flavor (whether made from plain or malted bumped rice kernels), an interesting texture and an attractive, contrasting toasted color (when the bumped rice kernels are made from brown rice). Rice nuggets are significant in making the chip look good, taste good and feel good when eaten.

Thus, it is an object of the present invention to provide a snack food chip having rice as its base ingredient which tastes good, looks good and feels good when eaten.

It is a further object of the present invention to provide a snack food chip having rice as its base ingredient which can be made on existing machinery.

It is another object of the present invention to use rice nuggets as a significant component of a snack food chip.

Yet another object of the present invention is to provide a dry mix including bumped rice kernels and rice flour from which a snack chip can be made.

Still another object of the invention is to provide a dough including bumped rice kernels and rice flour from which a snack chip can be made.

Another object of the invention is to provide a dough including bumped rice kernels and pregelatinized long-grain rice flour from which a snack chip can be made.

An additional object of the invention is to provide rice nuggets.

A further object of the invention is to provide methods for making the dough, rice nuggets and chips of the present invention.

DETAILED DESCRIPTION OF THE INVENTION

The present invention relates to a snack chip having rice as its primary ingredient. The chip is made from a dough that is sheeted, cut, parbaked, then fried before being packaged.

In one embodiment of the invention, the dough is made by combining water with a dry mix of bumped rice kernels, pregelatinized long-grain rice flour, coarse medium-grain white rice flour, tortilla chip flour, Crisp Film®, Textaid® A and sesame seeds. Other embodiments using ingredients other than tortilla chip flour, Crisp Film®, Textaid® A and sesame seeds are within the scope of the invention and at least one other will be described.

Bumped rice kernels is a well known product and is commercially available from a number of sources, including California Cereal Products, Inc., of Oakland, Calif., which describes its product as first grade, clean, whole brown rice that has been cooked and flavored with malt and salt and then oven-toasted. In the preferred embodiment, the bumped rice kernels are made from medium-grain brown rice.

Pregelatinized long-grain rice flour is a commercially available product, such as RF-G2080 offered by Sage V Foods, which describes its product as a finely ground, fully gelatinized rice flour which has excellent water holding capacity and thickens in cold water, releases water when baked and causes some expansion to the product, and provides a binding property and gives texture to dough to aid in machinability. Pregelatinized rice flour is well known to those skilled in the art.

Coarse medium-grain white rice flour is a commercially available product, such as Rice Flour #4511 from ACH Foods Corporation, Inc., of Cordova, Tenn. Coarse white rice flour is well known to those skilled in the art.

The combination of the water holding capability of the pregelatinized long-grain rice flour and the water absorbing capability of the bumped rice kernels forms a dough that can be sheeted using existing machinery known to those skilled in the art.

Tortilla chip flour is flour made from whole-grain yellow corn and is well known to those skilled in the art. The addition of the corn flour adds a desirable flavor and further adds to the ability of the predominately rice dough to be processed by available machinery.

Crisp Film® is a modified high amylose corn starch available from National Starch and Chemical Company, of Bridgewater, N.J., and is well known to those skilled in the art as an ingredient that adds crispiness to a fried product.

Textaid® A is a modified food starch refined from corn and available from National Starch and Chemical Company, of Bridgewater, N.J., and is well known to those skilled in the art as a product that gives texture and strength to a fried snack chip product.

Sesame seeds, such as those from Sesaco Corporation, of Paris, Tex., or their equivalent, are well known to those skilled in the art as a flavor enhancing ingredient.

In one embodiment of the invention, the following ingredients are combined in the following proportions to form a dry mix: bumped rice kernels (35%); pregelatinized long-grain rice flour (30%); coarse medium-grain white rice flour (8.75%); tortilla flour (8.75%); Crisp Film® (8.75%); Textaid® A (5.25%); and sesame seeds (3.5%). From these dry ingredients, a dough of the invention can be made by adding water. From the dough of the invention, the chips of the invention are formed.

In one embodiment of the invention, a dough is made by combining the following ingredients in the following proportions: water (45.5%); bumped rice kernels (20%); pregelatinized long-grain rice flour (17%); coarse medium-grain white rice flour (5%); tortilla flour (5%); Modified Food Starch—Sago 77-1869 (National Starch) (2.5%); Modified food starch—Textaid® A (National Starch) (3.0%); and sesame seeds (2.0%).

With the ingredients specified above, chips of the invention are made as follows:
(a) mix all dry ingredients for about one minute;
(b) add water and mix until dough forms with consistency suitable for passing through sheeter without sticking (e.g., between 30 seconds and 3 minutes);
(c) pass dough through roller head to form sheets which are between 1/16 and 1/8 inch thick;
(d) cut the sheets into chip-size pieces;
(e) expose chip-size pieces to oven temperature of approximately 690 degrees F. until moisture content is 2% or less (e.g., approximately 36 seconds);
(f) equilibrate by allowing to stand at room temperature (e.g., about 8 minutes);
(g) fry in 360-380 degree F. safflower oil until crisp (e.g., approximately 22 seconds);
(h) salt at a 0.5 to 0.8% salt (and/or add topical spices and flavorings).

The forgoing example is but one embodiment of the present invention. Temperatures and times, for example, can change with altitude and other conditions, amounts of ingredients and ingredients themselves may be varied or eliminated within the scope of the invention.

An alternative embodiment, where all the rice components are from brown rice, includes: water 37.5%; Organic Brown Rice Parboil (Lundberg Family Farms) 19%; Brown Rice Flour (Lundberg Family Farms) 15%; Brown Rice Kernels (CA Cereal Products, Inc.) 15%; Brown Rice Syrup Flour (Lundberg Family Farms) 8%; Instant Tapioca (National Starch—Novation 3300) 2.5%; Sesame Seeds 2%; Nu-Bake (Ribus, Inc) 1%. The procedure for processing this formulation into chips is the same as set forth above.

Nu-Bake, from Ribus, Inc., is an extract from rice bran that is derived through patented, proprietary technology.

As seen from the two examples, the relative proportions of the rice components can be varied so long as the resulting dough can be sheeted, cut, parbaked and fried to produce a desirable tasting and structurally useful chip. Likewise, the minor ingredients can be varied in amounts or eliminated altogether and other ingredients added, as long as they are present in amounts sufficient to lend the characteristics highlighted above to the resulting chip. It will be understood by those skilled in the art that in modifying, eliminating and/or adding ingredients, it will likely be necessary to vary the amounts of the other ingredients to produce a balanced blend that meets all the requirements for a useful and tasty chip. Thus, the invention is not limited to any particular set of relative percentages of ingredients, but is rather found in the combinations of key ingredients in amounts and relative proportions that produce the desired results.

When used, the bumped rice kernels are processed (partially hydrated, bumped by being passed through the sheeter, partially dehydrated and fried) so that they do not fully expand (become crisp rice) from the heat of either the partial dehydration or the frying process, but rather are transformed into crunchy rice nuggets. Also, the combination of the long-grain rice flour and the medium-grain rice flour forms a blend from which a dough can be made that can be processed on existing machinery to produce a chip having the desirable characteristics specified above.

Rice nuggets are useful in foods other than chips and, in particular, in just about any food that now uses crisp rice. The fried rice nuggets add a crunchy texture and flavorful boost to a food without all the air of traditional puffed rice.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A process for making a fried, crisp, rice-based commercial snack chip comprising:
    forming a dough from dry materials of which a major component by dry weight is the combination of pregelatinized long-gram rice flour, medium-gram coarse rice flour and bumped rice wherein said dough can be sheeted on known sheeting equipment without substantial sticking;
    sheeting the dough on known sheeting equipment;
    cutting the sheeted dough into chip-size pieces;
    partially dehydrating the chip-size pieces; and
    frying the chip-size pieces to obtain a crisp snack chip having expanded bumped rice that has a structure different than crisp rice.

2. The process of claim 1 wherein parbaking the chip-size pieces reduces the moisture content of the chip-size pieces.

3. The process of claim 1 wherein the sheeted dough is between 1/16 and 1/8 inch thick.

4. A process for making a rice-based snack chip from dry materials and water wherein a major component, based on weight of such dry materials, is pregelatinized long-grain rice flour, medium-grain coarse rice flour and bumped rice, comprising:
    frying chip-size pieces of a sheeted dough made from such dry materials after the chip-size pieces are first partially dehydrated, which results in a crisp snack chip including expanded bumped rice that does not have the same structure as crisp rice.

5. The process of claim 4 wherein the chip-sized pieces of sheeted dough are between 1/16 and 1/8 inch thick.

6. A process for making a fried rice-based commercial snack chip product comprising:
    forming a dough from water and dry materials which comprise pregelatinized long-grain rice flour, bumped rice, and medium-grain coarse rice flour, wherein rice comprises a major component by weight of the dry materials of the dough and the dough can be sheeted on known sheeting equipment having rollers without the dough sticking to the rollers; comprising:
    sheeting the dough on known sheeting equipment having rollers;
    cutting the sheeted dough into chip-size pieces;
    partially dehydrating the chip-size pieces; and
    frying the chip-size pieces; wherein said bumped rice is hydrated when the dough is formed; rebumped when the dough is sheeted; partially dehydrated when the dough is parbaked; and transformed into expanded rebumped bumped rice having a structure different than crisp rice when the parbaked chip-size dough pieces are fried.

7. A process for making a rice-based snack chip dough comprising:
    mixing water with dry materials wherein rice is a major component by weight of the dry materials of the dough and comprise pregelatinized long-grain rice flour, medium-grain coarse rice flour and bumped rice in amounts sufficient to allow the dough to be sheeted on known sheeting equipment having rollers without sticking to the rollers.

8. A process for making a rice-based snack chip comprising:
    mixing rice products including bumped rice kernels with other dry materials to form a dry mixture wherein rice products comprise a major component by weight of said dry mixture;
    hydrating the dry mixture and the bumped rice kernels to form a dough;
    sheeting the dough and rebumping the hydrated bumped rice kernels within the dough;
    partially dehydrating the sheeted dough and the rebumped bumped rice kernels; and
    frying the partially dehydrated sheeted dough, causing the partially dehydrated rebumped bumped rice kernels to expand but have a structure different than crisp rice.

9. The process of claim 8 wherein the dry materials comprise pregelatinized long-grain rice flour and medium-grain coarse rice flour in quantities sufficient to prevent or substantially reduce sticking of the dough on known processing equipment.

10. The process of claim 8 wherein the sheeted dough is between 1/16 and 1/8 inch thick.

11. A process for making a snack chip comprising:
    mixing bumped rice kernels with dry materials to provide a dry mixture;
    hydrating the dry mixture including the bumped rice kernels to form a dough;
    sheeting the dough and rebumping the hydrated bumped rice kernels within the dough;
    cutting the dough into chip-sized pieces;
    partially dehydrating the chip-sized pieces including the rebumped bumped rice kernels; and
    frying the partially dehydrated chip-sized pieces, causing the partially dehydrated rebumped bumped rice kernels to expand but have a structure different than crisp rice.

12. The process of claim 11 wherein the dry materials comprise rice flour.

13. A process for making a snack chip comprising:
    mixing bumped rice kernels with dry materials to provide a dry mixture;
    hydrating the dry mixture including the bumped rice kernels to form a dough;
    processing the dough to form a snack chip whereby the bumped rice kernels are caused to expand but have a structure different than crisp rice.

* * * * *